United States Patent
Ryu et al.

(10) Patent No.: US 8,279,053 B2
(45) Date of Patent: Oct. 2, 2012

(54) APPARATUS AND METHOD FOR VIBROTACTILE MOBILE DEVICE

(75) Inventors: Dong Seok Ryu, Seoul (KR); Sung Chul Kang, Seoul (KR); Gi Hun Yang, Gongju-si (KR); Woo Sub Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 366 days.

(21) Appl. No.: 12/671,192

(22) PCT Filed: May 19, 2009

(86) PCT No.: PCT/KR2009/002631
§ 371 (c)(1),
(2), (4) Date: Jan. 28, 2010

(87) PCT Pub. No.: WO2010/134649
PCT Pub. Date: Nov. 25, 2010

(65) Prior Publication Data
US 2011/0163860 A1    Jul. 7, 2011

(51) Int. Cl.
*G08B 6/00* (2006.01)
*G08B 5/22* (2006.01)
*H04B 3/36* (2006.01)
*G09B 21/00* (2006.01)
*G06F 3/033* (2006.01)
*G06F 3/041* (2006.01)
*H04M 1/00* (2006.01)

(52) U.S. Cl. ............ 340/407.2; 340/4.1; 340/4.12; 340/4.13; 340/407.1; 340/7.6; 345/159; 345/173; 455/567

(58) Field of Classification Search .......... 345/156, 345/159, 160, 173; 340/4.1, 4.12, 4.13, 407.1, 340/407.2, 7.6, 7.61; 455/567
See application file for complete search history.

(56) References Cited

U.S. PATENT DOCUMENTS
6,169,540 B1    1/2001    Rosenberg et al.
(Continued)

FOREIGN PATENT DOCUMENTS
KR    10-2008-0039551    5/2008
(Continued)

OTHER PUBLICATIONS

PCT International Search Report and Written Opinion, PCT Application No. PCT/KR2009/002631, Feb. 2, 2010, 14 pages.
(Continued)

*Primary Examiner* — Brian Zimmerman
*Assistant Examiner* — Omeed Alizada
(74) *Attorney, Agent, or Firm* — Fenwick & West LLP (57) ABSTRACT

This disclosure relates to a vibrotactile mobile device which induces a tactile sense at various positions in an interface method of operating the mobile device so that a user may intuitively interact with the mobile device while seeing a program execution status, and to a method of driving the vibrotactile mobile device. The method of driving the vibrotactile mobile device includes: providing a user interface for inputting a command signal on a screen operated in accordance with a program; calculating a target vibration position and a direction and a speed of a vibration flow with time so as to recognize a trajectory of the command signal displayed on the screen and supply a vibration stimulus corresponding to the trajectory of the command signal; and driving the vibration module by controlling a supply of power to be applied to vibration modules based on the calculated result.

8 Claims, 12 Drawing Sheets

U.S. PATENT DOCUMENTS

| | | | |
|---|---|---|---|
| 6,219,032 B1 * | 4/2001 | Rosenberg et al. | 345/157 |
| 6,342,880 B2 | 1/2002 | Rosenberg et al. | |
| 6,718,304 B1 * | 4/2004 | Tachimori et al. | 704/236 |
| 7,019,622 B2 * | 3/2006 | Orr et al. | 340/407.1 |
| 7,292,227 B2 * | 11/2007 | Fukumoto et al. | 345/173 |
| 7,474,296 B2 | 1/2009 | Obermeyer et al. | |
| 2002/0054021 A1 | 5/2002 | Rosenberg et al. | |
| 2003/0229871 A1 | 12/2003 | Nakae et al. | |
| 2005/0017947 A1 | 1/2005 | Shahoian et al. | |
| 2006/0022536 A1 | 2/2006 | Fujii et al. | |
| 2006/0055515 A1 * | 3/2006 | Yatsu et al. | 340/407.2 |
| 2006/0157632 A1 | 7/2006 | Delson | |
| 2007/0046627 A1 | 3/2007 | Soh et al. | |
| 2007/0216235 A1 | 9/2007 | Lee | |
| 2008/0084384 A1 | 4/2008 | Gregorio et al. | |
| 2008/0163051 A1 | 7/2008 | Olien | |
| 2009/0085882 A1 | 4/2009 | Grant et al. | |
| 2009/0132984 A1 | 5/2009 | Chander et al. | |
| 2011/0252390 A1 | 10/2011 | Sripada | |

FOREIGN PATENT DOCUMENTS

| | | |
|---|---|---|
| WO | WO 2008/045694 A1 | 4/2008 |
| WO | WO 2009/045820 A2 | 4/2009 |

OTHER PUBLICATIONS

Hollis, R.L. et al., "Lorentz Levitation Technology: A New Approach to Fine Motion Robotics, Teleoperation, Haptic Interfaces, and Vibration Isolation," Proceedings of the International Symposium for Robotics Research, 1993, 20 pages.

Kim, Seung-Chan, et al. "An Evaluation of Human Sensibility on Perceived Texture for Real Haptic Representation," Journal of the Korean Institute of Information Scientists and Engineers: Software and Application, Oct. 2007, vol. 34, No. 10, 36 pages (including English translation).

Cheon, Jae-min, et al., "Evaluating a Learning Effect of Mapping Vibration Feedbacks to DIS Menu Items," 2008 Chugye Conference of the Korean Institute of Industrial Engineers, Nov. 8, 2008, 25 pages (including English translation).

Das, S. et al., "The Automatic Generation of Merged-Mode Design Constraints," Jul. 29, 2009, fifteen pages. [Online] [Retrieval Date Unknown] Retrieved from the Internet <URL:http://fishtail-da.com/news.htm.>.

PCT International Search Report and Written Opinion, PCT Application No. PCT/KR2009/000316, Oct. 14, 2009, six pages.

* cited by examiner

APPARATUS AND METHOD FOR VIBROTACTILE MOBILE DEVICE

TECHNICAL FIELD

This disclosure relates to a vibrotactile mobile device which induces a tactile sense at various positions in an interface method of operating the mobile device so that a user may intuitively interact with the mobile device while seeing a program execution status, and to a method of driving the vibrotactile mobile device.

BACKGROUND ART

A method of delivering a tactile sense through vibration has been used to supply information intuitively in various input devices.

In recent years, convergence products having multiple functions have appeared, as various mobile devices such as mobile terminals, PDAs, MP3s, PMPs, and laptop computers are converged. Various efforts to supply an easy-to-use and intuitive interface based on a visual screen have been made and efforts to supply a multi-modal interface have also been made. The method of delivering a tactile sense through vibration has been used earlier to supply information intuitively.

For example, in a game controller device, an eccentric motor for generating vibration is equipped inside the controller device to give various vibration stimuli to a user in various situations such as collision in a car racing game or attack to an avatar in a fighting game. Therefore, the user may intuitively sense emergency situations while enjoying a game.

In a cellular phone, a call-incoming sound may be substituted by vibration using the vibrotactile sense, or device statuses such as button operations and battery shortage may be expressed intuitively. In recent years, efforts are made to subdivide the vibrotactile sense to realize a vibration pattern in various forms by the use of several vibration motors.

As for haptic gloves used to interact with a virtual environment, a user may wear the haptic gloves to control an avatar in a virtual environment through hand movements. When vibration units equipped at the portions corresponding to the fingers and the palm of the haptic gloves appropriately operate in accordance with various situations, the user may be completely immersed in the situations.

However, in the above-mentioned known vibration method, the parts stimulated by vibration are not subdivided. Moreover, a problem arises in that information expressed through the vibrotactile sense is restrained due to a limitation on the configuration of the known device permitting the vibration to be felt in the entire hands holding the device and it is also difficult to express high-level information such as spatial locations and directions.

DISCLOSURE OF INVENTION

In one aspect, there is provided a vibrotactile mobile device which supplies a tactile sense to a user by executing a program. The vibrotactile mobile device includes: a screen which visually displays an execution status of the program; a plurality of vibration modules which vibrate with a multi-level vibration strength to correspond to information shown on the screen; a vibration contact plate which is disposed outside the vibration modules and delivers the vibration generated by the vibration modules to the user; and a plurality of vibration isolating links which are connected to the vibration modules between the screen and the vibration modules and isolate the vibration generated by the vibration modules.

The size of an area where the plurality of vibration modules are disposed may be equal to or larger than the size of the screen.

The vibrotactile mobile device may further include a vibration controller which recognizes the position of a signal input through the screen to calculate a target vibration position on the vibration contact plate corresponding to the position of the signal, calculates distances between the target vibration position and the vibration modules, and controls a supply of power to be distributed to the vibration modules based on the calculated distances.

The vibration module may include an eccentric motor or a piezoelectric element.

The vibration isolating link may include a spring, a rubber plate, or a sponge.

The screen may include a touch screen.

In another aspect, there is provided a method of driving a vibrotactile mobile device which includes vibration modules. The method includes: (a) providing a user interface for inputting a command signal on a screen operated in accordance with a program; (b) calculating a target vibration position and a direction and a speed of a vibration flow with time so as to recognize a trajectory of the command signal displayed on the screen and supply a vibration stimulus corresponding to the trajectory of the command signal; and (c) driving the vibration module by controlling a supply of power to be applied to the vibration modules based on the calculated result.

The user interface may permit the command signal to be input by dragging an icon on the screen, setting coordinates on the screen to input a character, or turning a dial on the screen.

The calculating step (b) may include converting the trajectory of the command signal input in real time on the screen into consecutive target vibration positions of areas where the vibration modules are disposed.

The driving step (c) may include: (c1) selecting the vibration modules corresponding or contiguous to a target vibration position at a certain time; (c2) calculating distances between the vibration modules and the target vibration position; (c3) distributing the power to the vibration modules based on the result obtained by calculating the distances; and (c4) driving the vibration modules with a vibration strength corresponding to the distributed power.

MODE FOR THE INVENTION

This disclosure relates to a configuration in which a contact position for giving a stimulus is subdivided to supply a tactile sense of a mobile device and to an interface operation of the mobile device having this configuration to solve limitations of a known technique.

Hereinafter, with reference to the accompanying drawings, a vibrotactile mobile device and a method of driving the vibrotactile mobile device will be described in detail according to exemplary embodiments.

Figure 1:
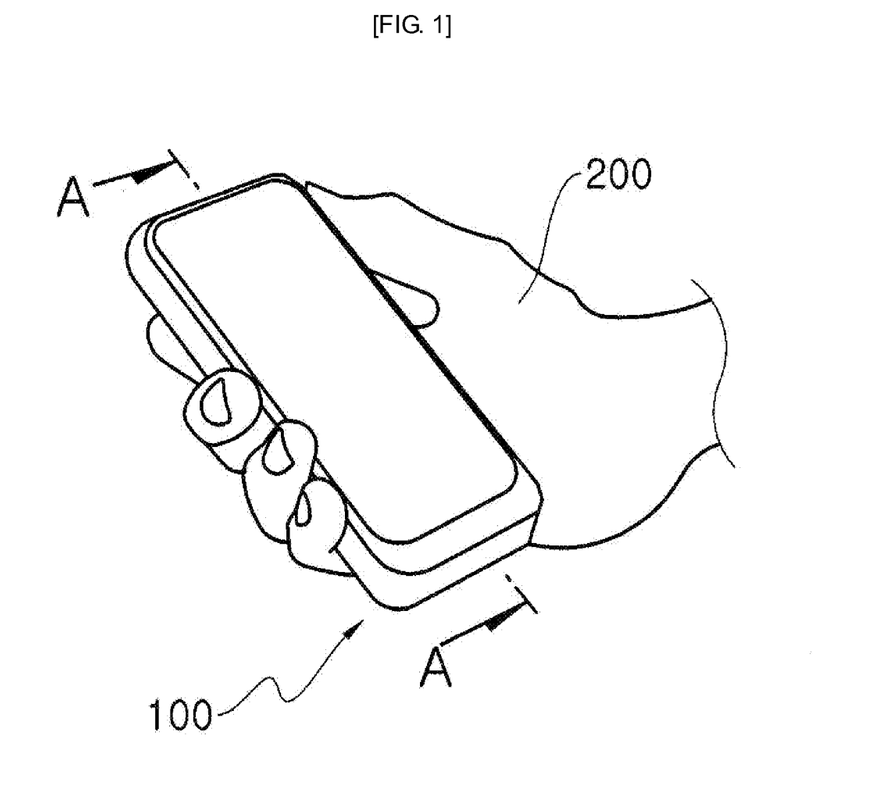
FIG. 1 is a diagram schematically illustrating the configuration of the vibrotactile mobile device according to an embodiment.
Figure 2:
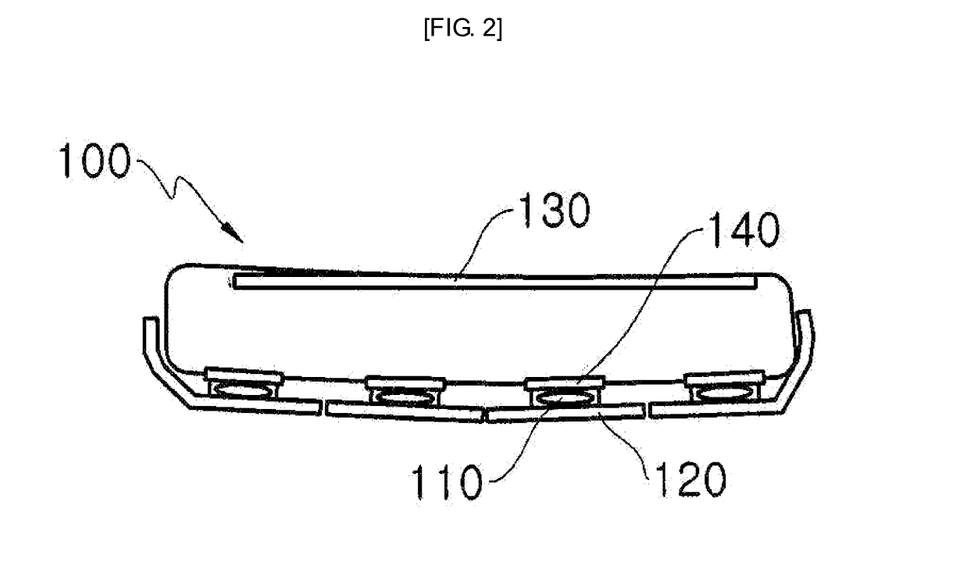
FIG. 2 is a sectional view illustrating the vibrotactile mobile device taken along the line A-A of FIG. 1.

FIG. 1 is a diagram schematically illustrating the configuration of the vibrotactile mobile device according to an embodiment. FIG. 2 is a sectional view illustrating the vibrotactile mobile device taken along the line A-A of FIG. 1.

With reference to FIGS. 1 and 2, the vibrotactile mobile device 100 according to this embodiment includes vibration modules 110, a vibration contact plate 120, and a screen 130. The vibrotactile mobile device 100 may optionally include vibration isolating links 140 and a vibration controller (not shown).

In general, the screen 130 is disposed on the front surface of the mobile device 100. A user usually holds the rear and side surfaces of the mobile device 100 with hands 200 and operates the device to execute a program.

The plurality of vibration modules 110 according to this embodiment are disposed on the rear and side surfaces of the mobile device 100, which are in contact with the hands 200. The size of an area where the plurality of vibration modules 110 are disposed may be equal to or larger than the size of the screen 130. Here, each of the vibration modules 110 may include an actuator for generating vibration. The actuator may include a small-sized eccentric motor or a linear vibration motor or a piezoelectric element vibrating in a uniform vibration direction, without limitation.

The vibration contact plate 120 is disposed outside the vibration modules 110 so as to come in contact with the hands 200 of the user. The vibration contact plate 120 delivers the vibration generated in the vibration modules 110 to the hands 200 of the user.

The screen 130 is disposed opposite to the vibration contact plate 120, that is, on the front surface of the mobile device 100, and displays the execution status of the program to the outside.

The vibration isolating links 140 are connected to the vibration modules 110, between the screen 130 and the vibration modules 110, and isolate the vibration delivered from the vibration modules 110. When the vibration modules 110 are mounted in the mobile device 100, the vibration has to be blocked not to be delivered over a predetermined range so that the vibration generated in a certain vibration module 110 may not be confused with the vibration generated in the vibration module adjacent to the vibration module 110.

Therefore, each of the vibration isolating links 140 is connected to one end of each of the vibration modules 110. Here, the vibration isolating links 140 have to be appropriately blocked. The surface of the mobile device 100 does not have to be completely depressed even when the user tightly holds the mobile device 100. Accordingly, the vibration isolating links 140 are made of a material having appropriate elasticity to maintain the surface shape of the mobile device 100. The vibration isolating links 140 are not particularly limited, but may be realized by a spring, a rubber plate, a sponge, etc.

The vibration controller (not shown) recognizes the position of a signal input through the screen 130 to calculate a target vibration position on the vibration contact plate 120 corresponding to the position of the signal and to calculate a distance between the target vibration position and each vibration module 110. The vibration controller controls a supply of power distributed to the vibration modules 110 based on the calculated distance value.

With such a configuration, it is possible to select a certain vibration module 110 among the plurality of vibration modules 110 mounted on the rear surface of the mobile device 100 and to drive the vibration modules 110 with a desired strength. The mobile device 100 according to this embodiment generates the vibration at predetermined positions through the vibration modules 110, when the user executes a program based on a visual interface seen on the screen 130. Accordingly, since the user feels the position and flow of the vibration operated along with the screen 130, the user may operate the mobile device 100 in a more intuitive manner.

According to this embodiment, the vibration modules 110 are attached to the body of the mobile device 100 along with the vibration isolating links 140, and the vibration controller for driving a certain vibration module 110 with predetermined power is included. The screen 130 operated in accordance with the program is disposed on the front surface of the mobile device 100 and a vibration stimulus suitable for a situation given on the screen 130 is supplied. Accordingly, the user may operate the mobile device 100 in an intuitive manner.

Figure 3:
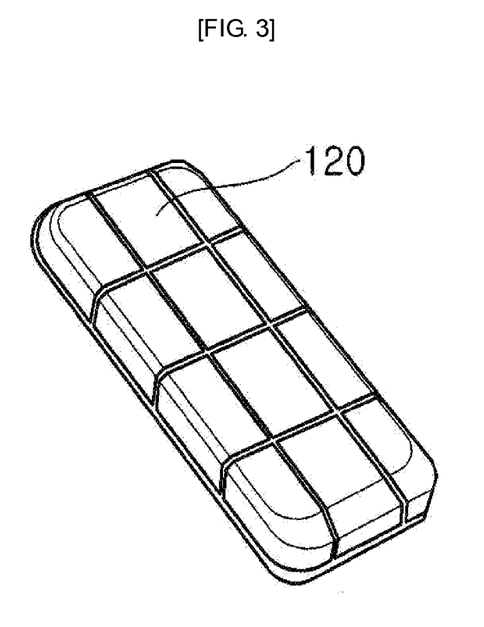
FIG. 3 is a perspective view illustrating the rear surface of the vibrotactile mobile device shown in FIG. 1.
Figure 4:
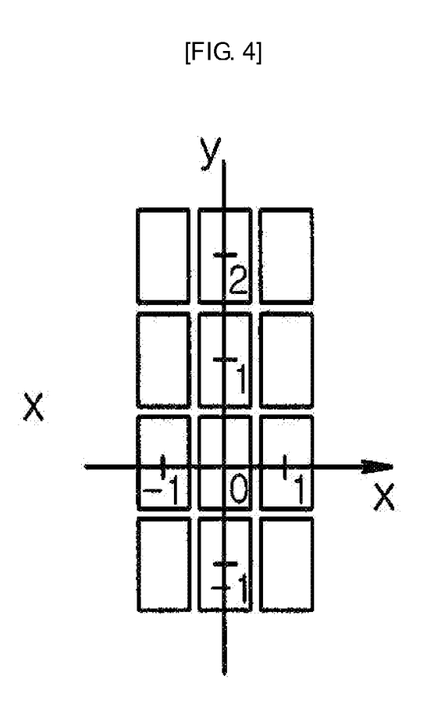
FIG. 4 is a diagram illustrating a definition of coordinate axes on the vibrotactile mobile device shown in FIG. 3.

FIG. 3 is a perspective view illustrating the rear surface of the vibrotactile mobile device shown in FIG. 1. FIG. 4 is a diagram illustrating a definition of coordinate axes on the vibrotactile mobile device shown in FIG. 3.

With reference to FIGS. 3 and 4, when positional information is to be represented through the vibration on the rear surface of the mobile device 100, the positional information may be represented by stimulating the vibration module 110 corresponding to the position. The user may feel the vibration generated in the adjacent vibration modules 110 on the palm of the hand and may feel as if single vibration stimulus occurs at a certain position due to interference of the vibration stimuli delivered to the palm of the hand.

The drawings show an example in which twelve vibration modules 110 are arranged in a matrix shape. According to the definition of the coordinate axes, $(-1, -1)$, $(-1, 0)$, $(-1, 1)$, $(-1, 2)$, $(0, -1)$, $(0, 0)$, $(0, 1)$, $(0, 2)$, $(1, -1)$, $(1, 0)$, $(1, 1)$, and $(1, 2)$ denote plane coordinates of the twelve vibration modules 110. For example, in order to deliver the positional information of $(1, 2)$, the right uppermost vibration module 110 among the twelve vibration modules 110 is driven to deliver the vibration stimulus.

Figure 5:
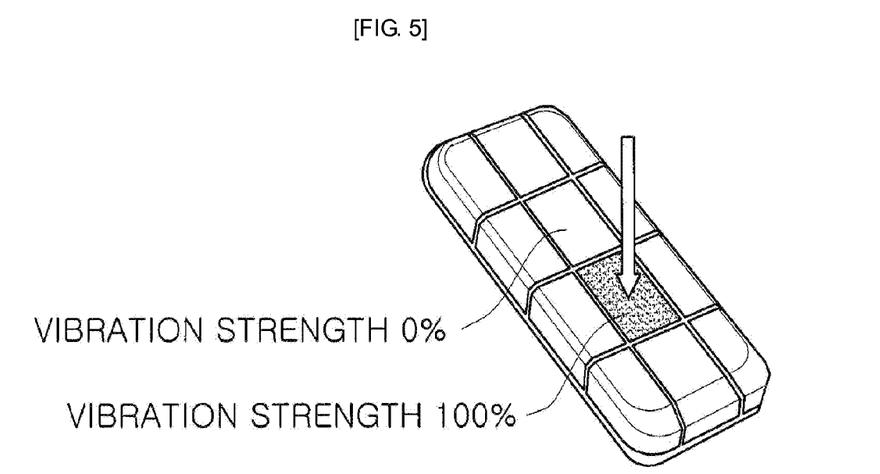
FIGS. 5 to 7 are diagrams for explaining a method of vibrating a certain position in the vibrotactile mobile device.
Figure 6:
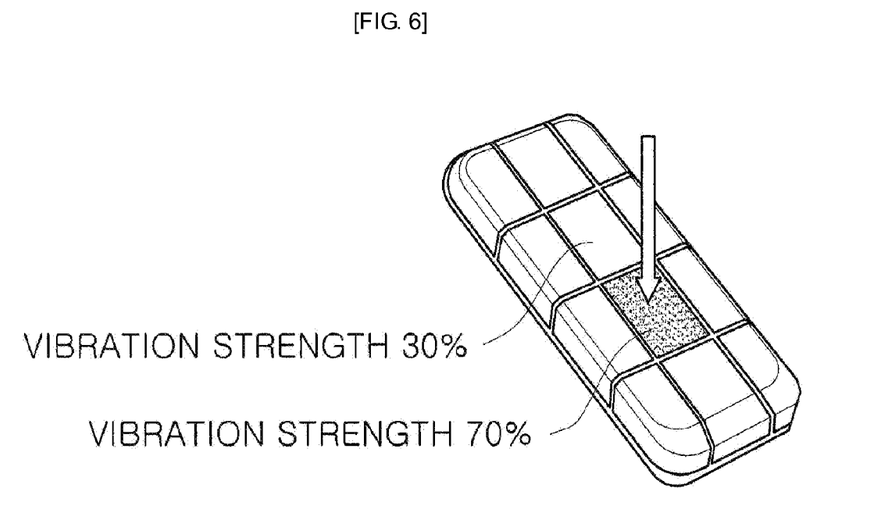
Figure 7:
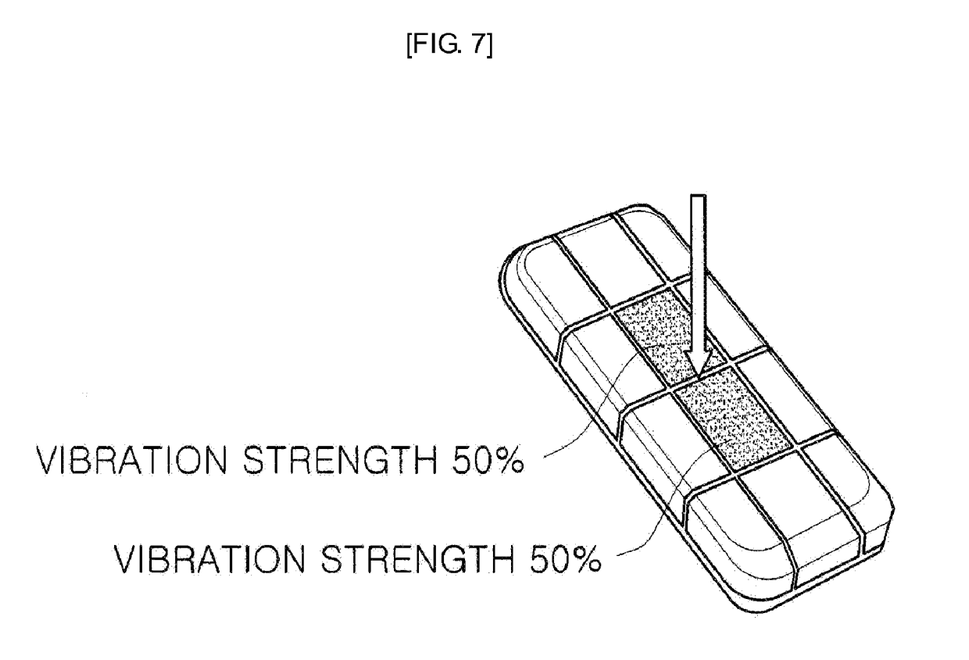

FIGS. 5 to 7 are diagrams for explaining a method of vibrating a certain position in the vibrotactile mobile device.

With reference to FIGS. 5 to 7, the mobile device 100 according to this embodiment may represent the positional information of the coordinates of each vibration module 110 and the positional information of an area between the vibration modules 110 by adjusting the strength of the vibration of each vibration module 110.

For example, the vibration modules 110 adjacent to the target vibration position between the vibration modules 110 are driven and the strength of the vibration is controlled so that the target vibration position is in inverse proportion to the distance. That is, the strength of the vibration generated in the vibration module 110 located at a certain coordinate is decreased linearly or logarithmically as the distance. The strength of the vibration at a certain position may be maximized by generating an interference with the vibration stimuli generated in adjacent vibration modules 110.

For example, the strength of the vibration may be represented by five levels (100%, 70%, 50%, 30%, and 0%). As seen in FIG. 5, to represent the vibration at $(0, 0)$, the vibration module 110 located at the coordinate $(0, 1)$ is driven with 0% strength and the vibration module 110 located at the coordinate $(0, 0)$ is driven with 100% strength.

In FIG. 6, to represent the vibration at (0, 0.25), the vibration module 110 located at the coordinate (0, 1) is driven with 30% strength and the vibration module 110 located at the coordinate (0, 0) is driven with 70% strength.

And, in FIG. 7, to represent the vibration at (0, 0.5), the vibration module 110 located at the coordinate (0, 1) is driven with 50% strength and the vibration module 110 located at the coordinate (0, 0) is driven with 50% strength. The aforesaid example is only an example. When the strength of the vibration of each vibration module 110 is adjusted more minutely, a more delicate position representation may be possible.

FIGS. 8 to 14 are diagrams for explaining a method of realizing a vibration flow on an arbitrary path with time.

Figure 8:
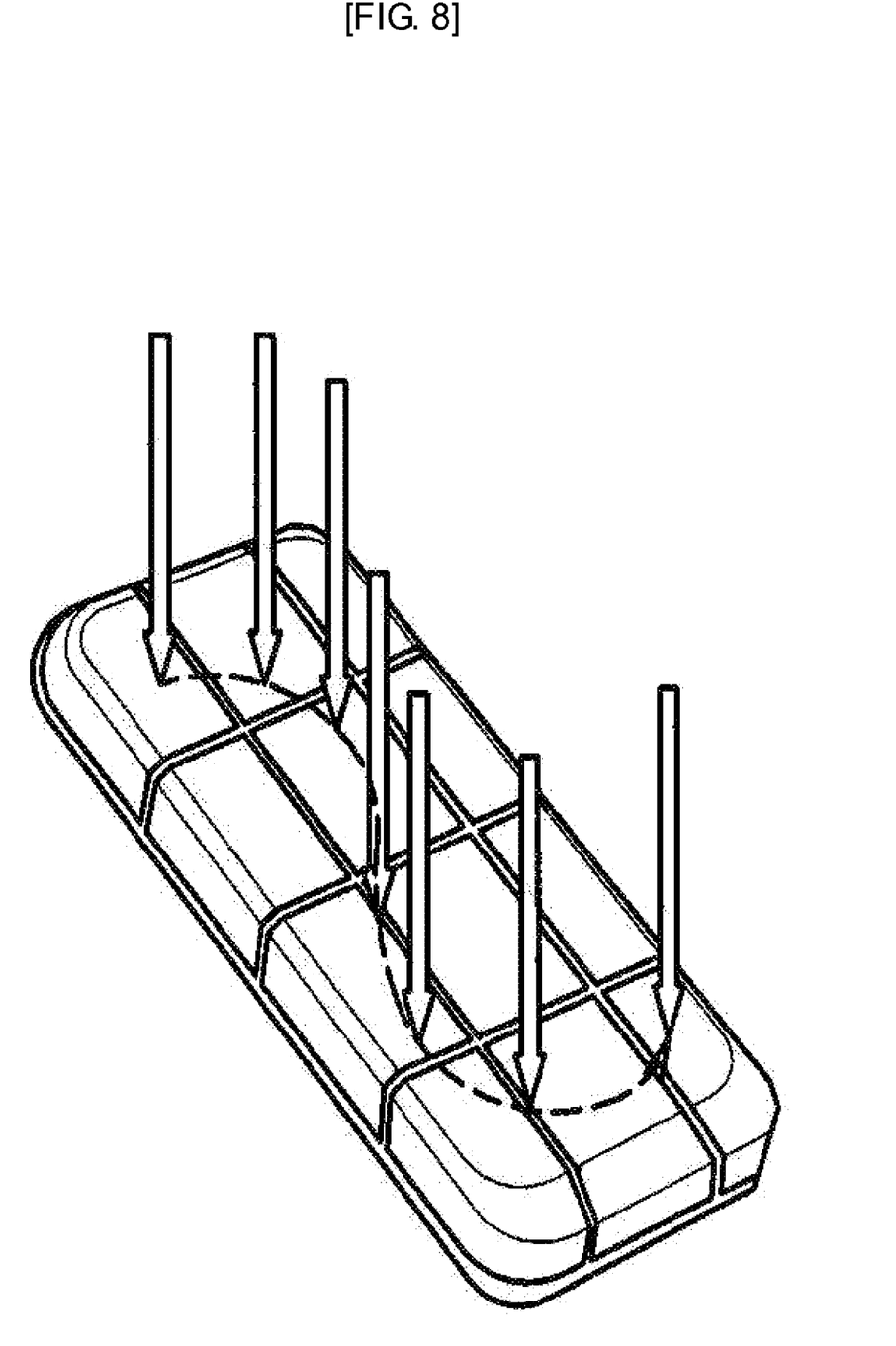
FIGS. 8 to 14 are diagrams for explaining a method of realizing a vibration flow on an arbitrary path with time.
Figure 9:
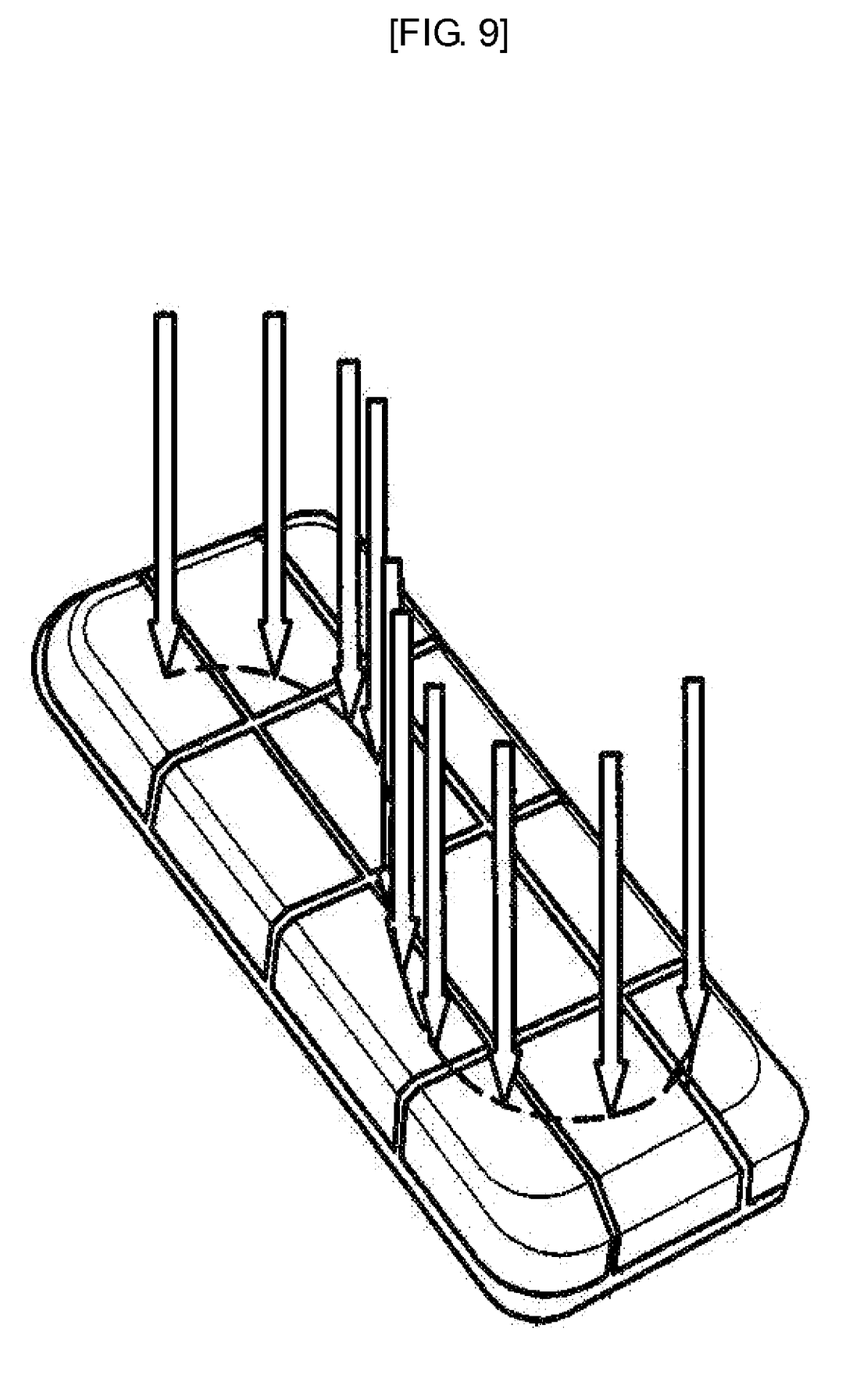
Figure 10:
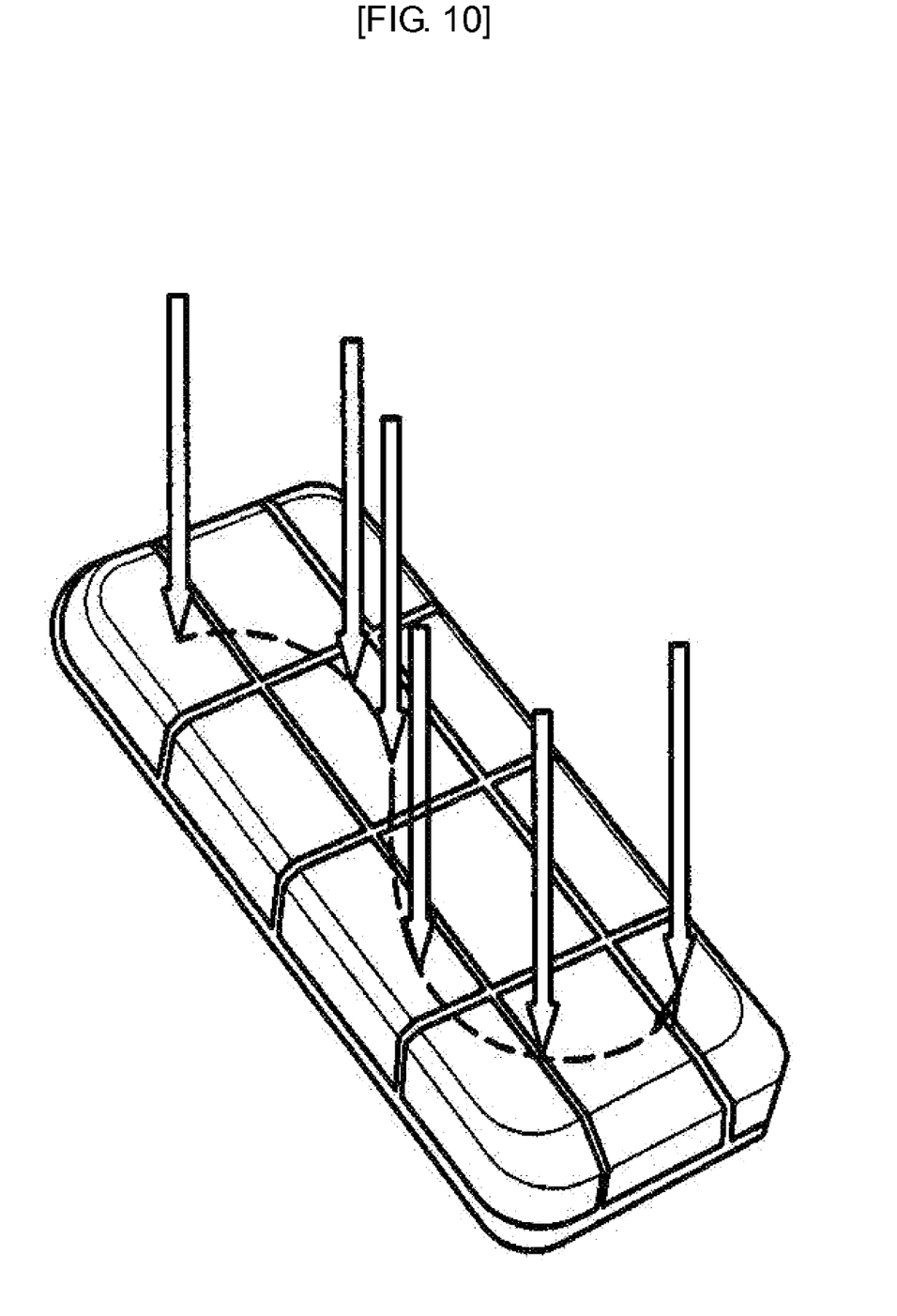

FIGS. 8 to 10 show a consecutive vibration flow formed with time while changing the stimulus of arbitrary positions to represent certain path, direction, speed, and the like.

When the vibration stimulus is supplied along the certain path, if the vibration stimulus is generated at more positions with a predetermined time interval, the user may recognize a slower speed, if the vibration stimulus is generated at fewer positions with a predetermined time interval, the user may recognize a faster speed.

For example, the vibration stimulus in FIG. 9 is generated along a predetermined path at a slower speed than the vibration stimulus in FIG. 8. And, the vibration stimulus in FIG. 10 is generated at a faster speed than the vibration stimulus in FIG. 8.

Figure 11:
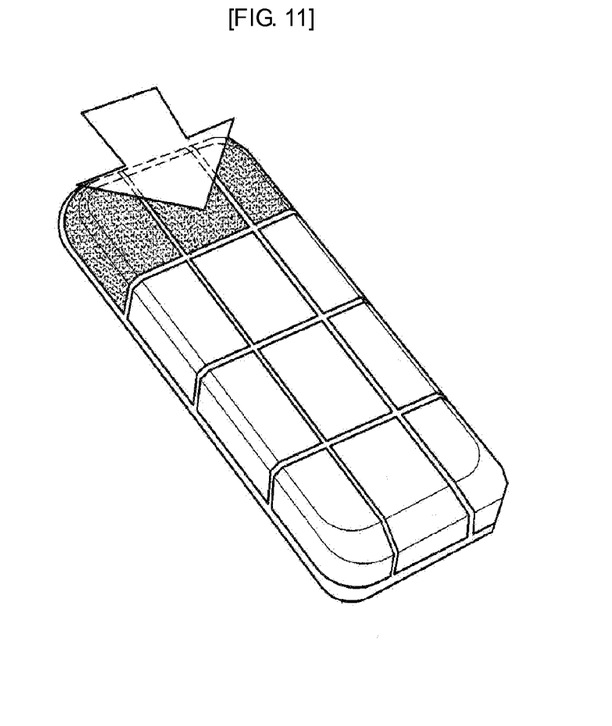
Figure 12:
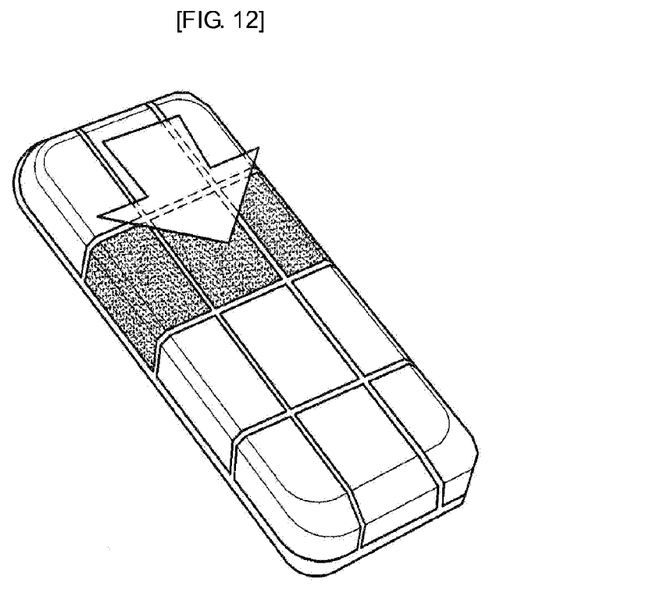
Figure 13:
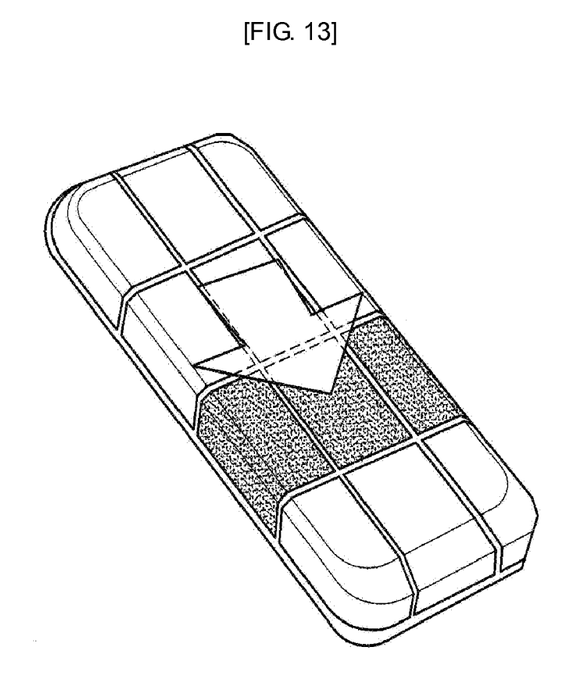
Figure 14:
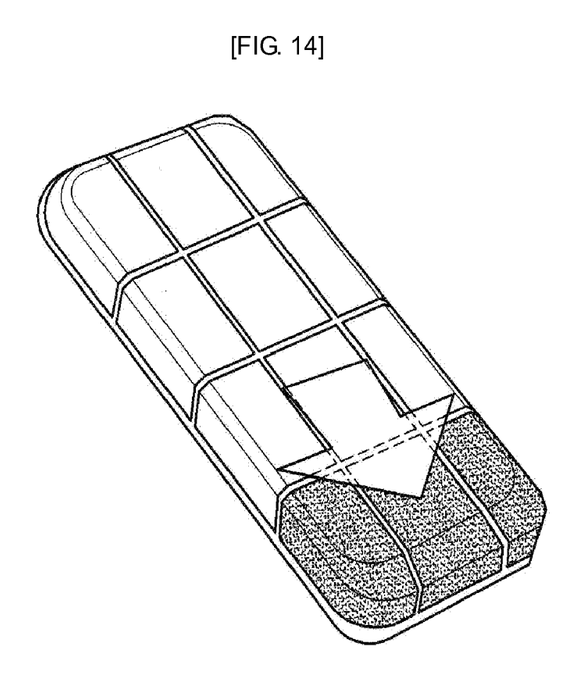

FIG. 11 shows that the vibration modules 110 located at the coordinates (−1, 2), (0, 2), and (1, 2) are driven simultaneously. FIG. 12 shows that the vibration modules 110 located at the coordinates (−1, 1), (0, 1), and (1, 1) are driven simultaneously. FIG. 13 shows that the vibration modules 110 located at the coordinates (−1, 0), (0, 0), and (1, 0) are driven simultaneously. FIG. 14 shows that the vibration modules 110 located at the coordinates (−1, −1), (0, −1), and (1, −1) are simultaneously driven.

When the vibration modules 110 are sequentially driven, as in FIGS. 11 to 14, the user may feel the vibration moving sequentially in the y-axis direction.

Although not shown in the drawings, a vibration moving sequentially in the x-axis direction may also be represented in the same principle. With appropriate combination thereof, a vibration moving in an arbitrary direction may be represented.

The exemplary configuration in which the twelve vibration modules 110 are arranged in the matrix shape according to this embodiment has been described with reference to FIGS. 3 to 14. However, the disclosure is not limited thereto. A smaller or larger number of vibration modules may be disposed depending on the size of the mobile device 100, a precision of the vibration position representation, and the like.

Figure 15:
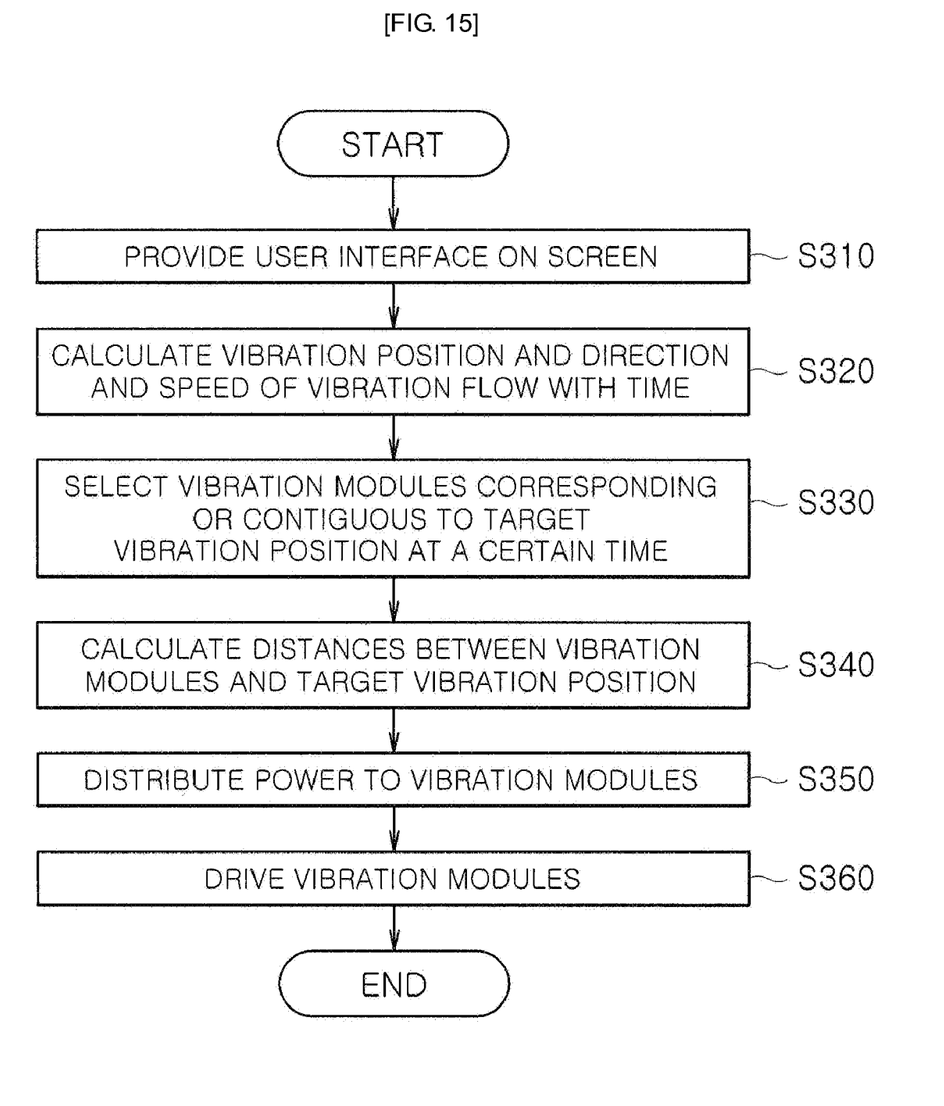
FIG. 15 is a flowchart illustrating a method of driving the vibrotactile mobile device according to an embodiment.

FIG. 15 is a flowchart illustrating a method of driving the vibrotactile mobile device according to an embodiment.

With reference to FIG. 15, a user interface is provided on the screen 130 operated in accordance with the program to input command signals of selection of various menus, status display, result output, and the like, when the vibrotactile mobile device according to this embodiment is driven (S310). Here, the user interface may be configured as a general screen interface used in existing mobile phones, PDAs, and the like. That is, the user interface may be configured so that a touch screen or a pen input space through which icons are operable to execute a program by clicking or dragging, files are copied and transferred, or texts or the like are input is provided, or a program is executed by means of a drop-down menu, a list menu, a slider bar menu, a scroll bar menu, a button menu, and the like.

Subsequently, the target vibration position and the direction and the speed of the vibration flow with time are calculated so as to recognize the trajectory of the command signals input through the user interface and displayed on the screen 130 and so as to supply the vibration stimulus to the hands 200 of the user in correspondence to the trajectory of the command signals (S320).

That is, the target vibration positions for the vibration positions and the speed and direction of the vibration flow are generated to supply the appropriate vibration stimulus interlocked with the screen 130. For example, when the user drags an icon, the value of the target vibration position on the vibration contact plate 120 may be generated by recognizing the coordinate of the icon located on the screen 130. Then, the user may feel the icon moving on the screen 130 through the moving vibration positions on the hands 200.

Alternatively, when characters are input with a pen, the value of the target vibration position on the vibration contact plate 120 may be generated using the coordinate information input through the screen 130 with the pen. Then, the user may feel the positions drawn by the tip of the pen on the hands 200 through the vibration positions.

Specifically, the target vibration position on the vibration contact plate 120 corresponding to a certain position on the screen 130 is matched with the coordinate system of the vibration modules 110 and the vibration modules 110 adjacent to the target vibration positions are selected (S330).

Subsequently, the distances between the selected vibration modules 110 and the target vibration position are calculated (S340) and a power applied to the vibration modules 110 is subdivided (S350) such that a larger power is applied to the vibration modules 110 close to the target vibration position and a smaller power is applied to the vibration modules 110 distant from the target vibration position.

A proportional relation between the distance and the power may be obtained using a linear function or an logarithmic function. If necessary, various functions such as a quadratic function, a cubic function, and a trigonometrical function may be used. A proportional factor for each function may be selected through experiments so as to maximize the tactile sense of the user.

Subsequently, the vibration modules 110 are driven with time to realize the calculated target vibration position and the direction and the speed of the vibration flow (S360).

While seeing the screen 130 of the vibrotactile mobile device 100, the user receives the vibration stimulus operated along with screen information on the fingers and the palm of the hand holding the mobile device and may thus feel the vibration position and the vibration flow matching with the interface situation seen on the screen 130.

Figure 16:
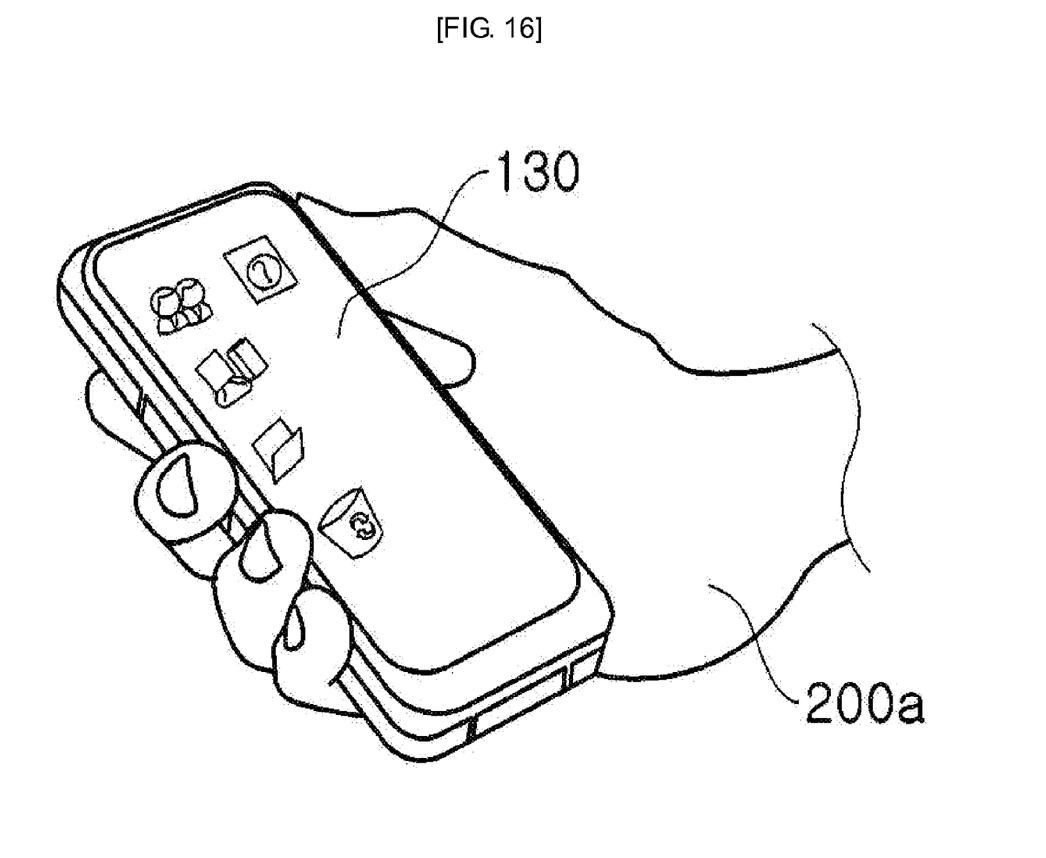
FIGS. 16 to 18 are diagrams illustrating operations of the vibrotactile mobile device according to an embodiment.
Figure 17:
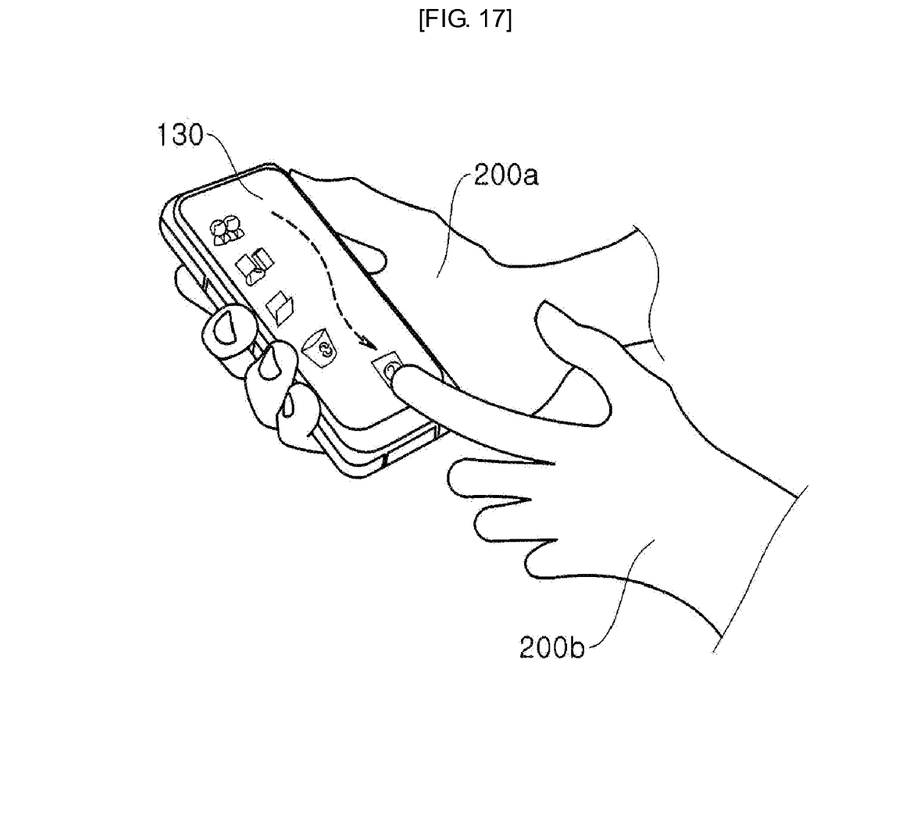
Figure 18:
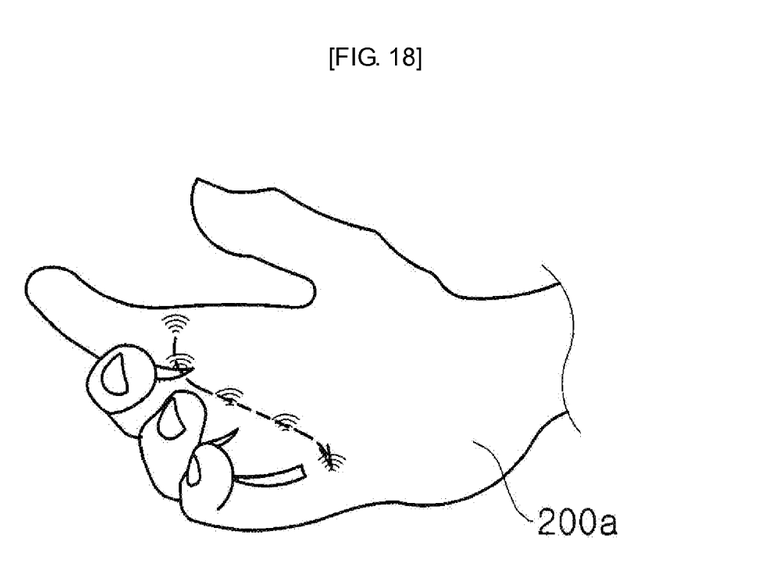

For example, as shown in FIGS. 16 to 18, if the screen 130 is a touch screen, when the user drags an icon with a left hand 200b, the vibration modules 110 are driven so as to correspond to the dragged trajectory and thus the vibration is delivered to a right hand 200a of the user. That is, the vibration controller converts the trajectory of the command signal input on the screen 130 in real time into the consecutive target vibration positions of the areas where the vibration modules 110 are arranged. The vibration controller drives the related vibration modules 110 to deliver the vibration corresponding to the trajectory to the hands 200 of the user.

As an example of the method of driving the vibrotactile mobile device 100 according to the above-described embodiment, the user interface may be supplied by forming the screen 130 with a touch screen.

When the user inputs the command signal on the touch screen with a finger or a stylus pen, the vibration controller of the mobile device 100 recognizes the contact position of the finger or the stylus pen. Subsequently, the screen is updated in accordance with the recognized positional information to allow the movement of an icon.

Subsequently, the positional information to be represented in accordance with the recognized positional information is calculated and the power applied to the vibration modules 110 with time is subdivided.

Then, when the user clicks or drags the icon shown on the screen 130, the user may sense the position of the icon through the vibration position or the vibration flow on the hand.

As another example of the method of driving the vibrotactile mobile device 100 according to this embodiment, another method of providing a user interface based on a touch screen 130 will be described.

First, when the user inputs the command signal on the touch screen with a finger or a stylus pen, the vibration controller of the mobile device 100 recognizes the contact position of the finger or the stylus pen. Then, the screen is updated in accordance with the recognized positional information and a list menu is scrolled.

Subsequently, information on the direction and the speed of the vibration flow is calculated in accordance with a scroll direction of the list menu. The power applied to the vibration modules 110 is distributed with time to represent the direction and the speed of the vibration flow.

As the user scrolls the list menu shown on the screen, the user may sense the vibration flow in the scroll direction on the hand holding the mobile device 100.

As still another example of the method of driving the vibrotactile mobile device 100 according to this embodiment, still another method of providing a user interface based on a touch screen 130 will be described.

When the user inputs the command signal on the touch screen with a finger or a stylus pen, the vibration controller of the mobile device 100 recognizes the contact position of the finger or the stylus pen. Next, the screen is updated in accordance with the recognized positional information and a screen interface is scrolled to allow the user to dial input numbers.

Subsequently, information on a rotation direction and a rotation speed of the vibration flow is calculated in accordance with the rotation of the dial interface. The power applied to the vibration modules 110 is distributed with time to represent the rotation direction and rotation speed of the vibration flow.

As the user dials the dial interface shown on the screen, the user may sense the vibration flow in the rotation direction on the hand holding the mobile device 100.

As still another example of the method of driving the vibrotactile mobile device 100 according to this embodiment, still another method of providing a user interface based on a touch screen 130 will be described.

When the user inputs the command signal on the touch screen with a finger or a stylus pen, the vibration controller of the mobile device 100 recognizes the contact position of the finger or the stylus pen. Next, the screen is updated in accordance with the recognized positional information to output a scroll bar.

Subsequently, information on the direction and the speed of the vibration flow is calculated in accordance with a variation in the position of the scroll bar. The power applied to the vibration modules 110 is distributed with time to represent the rotation direction and rotation speed of the vibration flow.

As the user dials the dial interface shown on the screen 130, the user may sense the vibration position or the vibration flow of the scroll bar on the hand holding the mobile device 100.

The vibrotactile mobile device 100, which includes the plurality of vibration modules 110 and drives the plurality of vibration modules with an appropriate strength, provides the tactile sense as if the vibration is generated on a certain position of the palm of the hand, differently from known mobile devices which generate a vibration pattern by simply varying the vibration time or the vibration strength to show information to a user.

Accordingly, since the user receives the vibration position or the direction and the speed of the vibration flow matching with the status of the user interface interlocked with the screen 130 of the mobile device 100, the user may operate the mobile device 100 in an intuitive and realistic way.

While the exemplary embodiments have been shown and described, it will be understood by those skilled in the art that various changes in form and details may be made thereto without departing from the spirit and scope of this disclosure as defined by the appended claims.

The invention claimed is:

1. A vibrotactile mobile device which supplies a tactile sense to a user by executing a program, comprising:
   a screen which visually displays an execution status of the program;
   a plurality of vibration modules which vibrate with a multi-level vibration strength to correspond to the information shown on the screen;
   a vibration contact plate which is disposed outside the vibration modules and delivers the vibration generated by the vibration modules to the user;
   a plurality of vibration isolating links which are connected to the vibration modules between the screen and the vibration modules and isolate the vibration generated by the vibration modules; and
   a vibration controller which (a) recognizes the position of a signal input through the screen to calculate a target vibration position on the vibration contact plate corresponding to the position of the signal, (b) calculates distances between the target vibration position on the vibration contact plate and the plurality of vibration modules, and (c) controls a supply of power distributed to the vibration modules based on the calculated distances.

2. The vibrotactile mobile device according to claim 1, wherein a size of an area where the plurality of vibration modules are disposed is equal to or larger than the size of the screen.

3. The vibrotactile mobile device according to claim 1, wherein each vibration module comprises an eccentric motor or a piezoelectric element or a linear vibration motor.

4. The vibrotactile mobile device according to claim 1, wherein the vibration isolating link comprises a spring, a rubber plate, or a sponge.

5. The vibrotactile mobile device according to claim 1, wherein the screen is a touch screen.

6. A method of driving a vibrotactile mobile device which includes vibration modules, the method comprising:
   (a) providing a user interface for inputting a command signal on a screen operated with a program;
   (b) calculating a target vibration position and a direction and a speed of a vibration flow with time to recognize a trajectory of the command signal displayed on the screen and supply a vibration stimulus corresponding to the trajectory of the command signal; and (c) driving the vibration modules by controlling a supply of power to be applied to the vibration modules based on the calculation;

wherein the driving step (c) includes:

(c1) selecting the vibration modules corresponding or contiguous to the target vibration position at a certain time;

(c2) calculating distances between the vibration modules and the target vibration position;

(c3) distributing the supply of power to the vibration modules based on the calculated distances; and (c4) driving the vibration modules with a vibration strength corresponding to the distributed supply of power.

7. The method according to claim 6, wherein the user interface permits the command signal to be input by dragging an icon on the screen, setting coordinates on the screen to input a character, or turning a dial on the screen.

8. The method according to claim 6, wherein the calculating step (b) includes converting the trajectory of the command signal input in real time on the screen into consecutive target vibration positions of areas where the vibration modules are disposed.

* * * * *